United States Patent [19]

Merrifield, deceased

[11] Patent Number: 4,819,948
[45] Date of Patent: Apr. 11, 1989

[54] SUBMERGED SHAFT SEAL

[75] Inventor: G. David Merrifield, deceased, late of St. Louis County, Mo., by Eileen Merrifield, administratrix

[73] Assignee: Delta Dredge and Pump Corporation, St. Louis, Mo.

[21] Appl. No.: 528,598

[22] Filed: Sep. 1, 1983

[51] Int. Cl.[4] .................. F16J 15/40; F16J 15/447
[52] U.S. Cl. .......................................... 277/3; 277/56; 277/59
[58] Field of Search .................. 277/3, 53, 55, 56, 59, 277/54, 57, 27, 152, 4, 135

[56] References Cited

U.S. PATENT DOCUMENTS 3,477,385  11/1969  Tangeman et al. ................. 277/56
3,642,292   2/1972  Dougherty ........................... 277/56
4,139,203   2/1979  Garrison ............................... 277/56
4,222,575   9/1980  Sekiguchi et al. .................. 277/59

Primary Examiner—Robert S. Ward
Attorney, Agent, or Firm—Polster, Polster and Lucchesi

[57] ABSTRACT

A submerged rotating shaft mechanism, including a gearbox with a gland connected to it and a shaft projecting from the gearbox through and beyond the gland, has an inner seal adjacent the gearbox, an outer, labyrinth, seal adjacent an outer end of the gland, the inner and outer seals forming, with the inside of the gland and the outside of the shaft, a chamber, a fitting communicates, through the gland, with the chamber, and compressed air is supplied to the chamber through the fitting to provide a constant flow of air through the labyrinth seal to flush that seal.

14 Claims, 1 Drawing Sheet

SUBMERGED SHAFT SEAL

BACKGROUND OF THE INVENTION

In situations in which a drive shaft, such as the output shaft from a gearbox, is submerged, and a seal has to be provided to prevent the ingress of the fluid in which the shaft is submerged, the life of the seal, particularly where the fluid contains abrasive particles, is short. For example, in dredge pumps working in sandy environments, the life of the seals is frequently on the order of 600 hours. The invention will be described as applied to a dredge pump, because it is particularly useful in that application, but its use is not limited to such an application.

It has been found that by the use of the seal system of this invention, the life of the seal can be extended to in excess of 2,000 hours. As will be appreciated from the description, the system of this invention requires additional equipment beyond what is ordinarily required, and therefore its utility depends upon a substantial improvement in the life of the seal beyond what has been known heretofore. As has been indicated, the system of this invention does in fact extend that life more than enough to justify the expense of the additional equipment.

One of the objects of this invention is to provide a seal system for a submerged drive shaft that provides long life under difficult conditions.

Another object is to provide such a system which utilizes standard components and is simple to install and maintain.

Other objects will become apparent to those skilled in the art in the light of the following description and accompanying drawing.

SUMMARY OF THE INVENTION

In accordance with this invention, generally stated, a seal system is provided for a submerged rotating shaft mechanism of the type in which a cylindrical shaft rotates in a gland an outer end of which, beyond which the shaft projects, is below the level of liquid in which the shaft rotates. The seal system includes at least one inner seal, an outer seal spaced from the inner seal in a direction toward the outer end of the gland to define with the inner seal and an interior surface of the gland a chamber, a fluid connection communicating with the chamber, and a source of fluid under super-ambient pressure communicating with the connection, hence the chamber, the outer seal being such as to permit a limited flow of the fluid under pressure through it. In the preferred embodiment the fluid under pressure is air, the outer seal is a labyrinth seal, and an innermost seal is positioned between the inner seal and the drive mechanism such as a gearbox, from which the drive shaft projects. In this embodiment, in which a gearbox is provided, oil under pressure is supplied to the gearbox at a pressure comparable to that of the air pressure supplied to the chamber, so as largely to balance the forces on the inner and innermost seals.

DESCRIPTION OF THE PREFERRED EMBODIMENT

Figure 1:
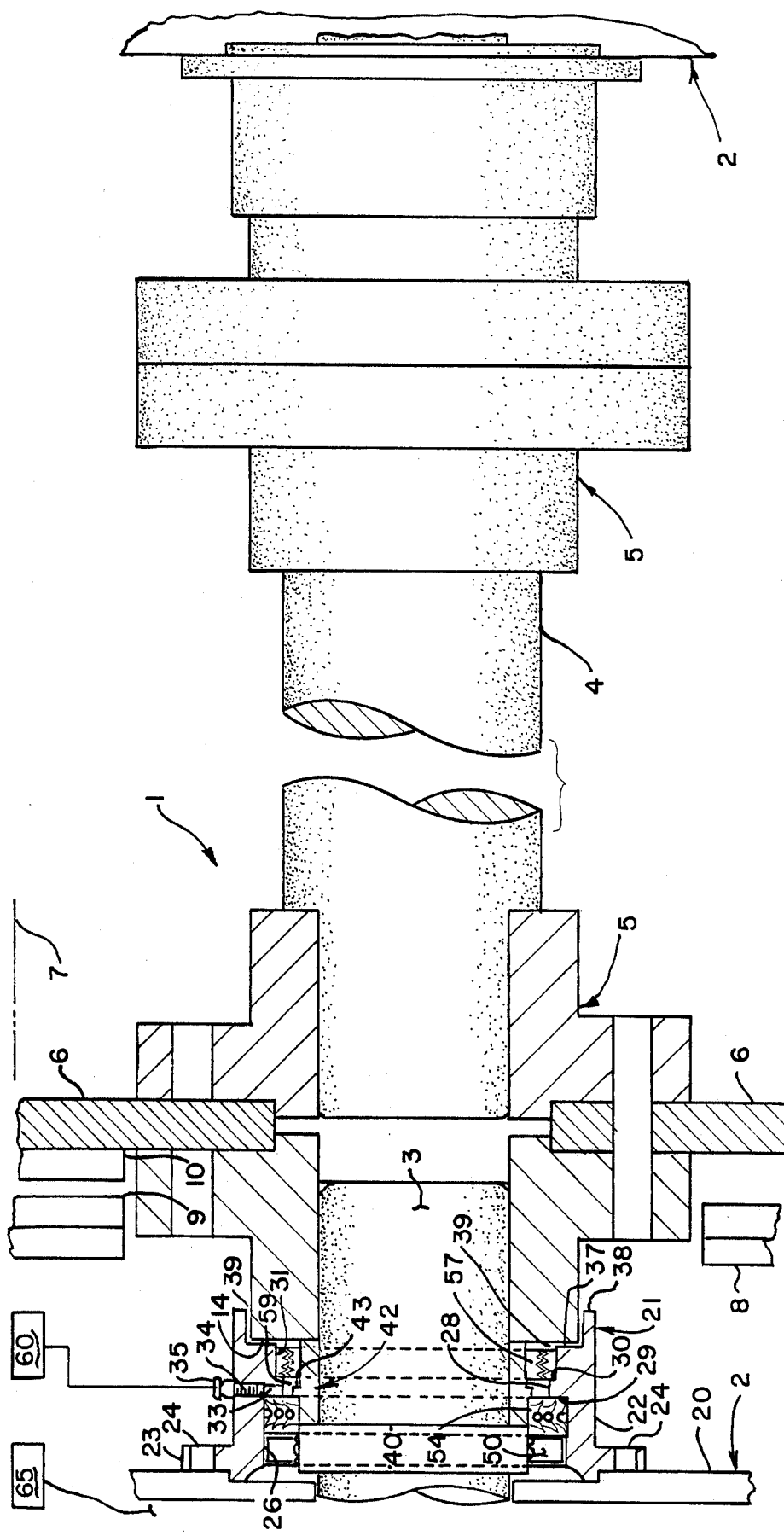
FIG. 1 is a view in side elevation, partly in section, partly broken away, and partly diagrammatic, illustrating one illustrative embodiment of seal system of this invention as applied to a dredge pump.

Referring to the drawing for one illustrative embodiment of this invention, reference numeral 1 indicates a dredge pump, in this case with a dual drive, with gearboxes 2. The seal system of this invention is applied to both drives in the same way, so that only the system in the left drive will be described. The terms "inboard" and "outboard" are used to indicate positions toward and away from the gear box 2 along the axis of rotation of a drive shaft 3 projecting from the gearbox 2. At its outboard end, the shaft 3 is connected to one half of an impeller hub 5, to the other half of which an impeller shaft 4 is connected. Sandwiched between the halves of the hub 5 is an impeller backplate 6, mounted to the hub by means of bolts, not here shown. The backplate 6 carries an impeller 7 and, on one radial surface, expeller vanes 10. The impeller is housed in a pump case 8, on the side of which toward the backplate 6 is a case wear plate 9. All of these elements are standard.

The inboard half of the impeller hub 5 has an inboard radial face 14 facing toward a gearbox case 20. The gearbox case 20 has a customary drive shaft opening, surrounded by a gland 21 mounted to the gearbox by bolts, not here shown. The gland 21 has a cylindrical body 22, and the usual flange 23 with bolt holes 24 through which the mounting bolts pass into internally threaded wells in the gearbox casing 20. The gland 21 of this embodiment has an inner annular seat area 26 defined on its outboard margin by an inboard radial surface 29 of a radially inwardly extending annular rib 28. The rib 28 has an outboard radial surface 30 defining the inboard margin of an outboard seat section 31. An air passage 33 extends radially through the body 22 and rib 28. An internally threaded section 34 of the air passage 33 receives a fitting 35, shown in the form of a nipple.

The outboard margin of the outer seat section 31 is defined by the edge of an outboard radial face 37 extending to the inner annular surface of a lip 38 surrounding the inboard peripheral surface of the hub 5, to define with the face 37 of the gland, the radial surface 14 of the hub, the inner surface of the lip 38, and the peripheral surface of the hub, a passage 39.

The drive shaft 3 has, adjacent the gearbox case 20, an integral collar 40. Abutting the collar 40 and extending outboardly along the shaft is a wear sleeve 42 that is sweated onto the shaft. The wear sleeve becomes effectively part of the shaft for the purposes of this invention, and when clearances or chambers are described as being between the gland and the shaft, they are intended to mean between the gland and the wear sleeve, where applicable. The wear sleeve 42 has an outwardly projecting step or rib 43, spaced radially from the inner annular surface of the rib 28.

In this embodiment, a double-lip seal 50 is mounted with its lips engaging the outer surface of the collar 40, contiguous the gearbox case 20, in the most inboard part of the seat 26. Immediately outboard of the double-lip seal 50 is a single-lip seal 54 the radially inner surface of which engages the outer surface of the wear sleeve 42 inboard of the step 43, and the radially outer surfaces of which engage the inner surface of the seal 26 adjacent the rib 28. A labyrinth seal 57 is mounted in the outer seat section 31 of the gland, with its inner surface engaging the outer surface of the wear sleeve 42, and its outer surface engaging the inner surface of the outer seat section 31.

The outboard radial surface of the inner, single-lip seal, the inboard radial surface of the outer, labyrinth seal, the radially outer surface of the wear sleeve and the radially inner surface of the gland, in this embodiment, of the rib 28, define a chamber 59 with which the passage 33 and nipple 35 communicate.

A source of air pressure 60, such as an air compressor and tank is operably connected to provide a continuous flow of air at a pressure within the chamber 59 of, for example, 15 lbs. psig. It will be evident that the pressure to be supplied will depend upon the depth to which the gland is submerged, the pressure within the chamber having to be maintained higher than the hydraulic head to ensure a constant flow of air through the labyrinth seal. Preferably, the pressure of oil within the gearbox will be substantially the same as that of the air.

The use of a labyrinth seal as the outer seal permits easy control of the flow of air, which should be constant but preferably at a low volume, to provide a gentle flushing of the seal. It can be seen that the seal through which the air passes must offer a substantial resistance to its passage. A mechanical seal, or some other type of seal can be used, but, as a general proposition, the labyrinth seal provides the best control with a readily available product.

Merely by way of illustration, the double-lip seal can be of a type identified as National 415937, a product of Federal-Mogul Corp., Southfield, Mich., the single-lip seal can be of the type known as ANKORITE M.A.T. Polyflex packings, a product of The Anchor Packing Company, Philadelphia, Pa., and in particular, in the embodiment shown in the drawing, a Polyflex Set of three seals, a low friction self-lubricating seal, and the labyrinth seal, one identified as an EG&G Sealol, Inc. MINI-MAZE, the product of the Industrial Division of Sealol, Inc., Chicago, Ill. These are standard, commercially available seals.

Numerous variations in the construction of the seal system of this invention, within the scope of the appended claims, will become apparent to those skilled in the art in the light of the foregoing disclosure. Merely by way of example, different seals can be employed, particularly if a fluid different from air is used. For example, in an extremely abrasive fluid environment, it may be useful to use clean water rather than air. The system of this invention can be used in other applications, as, for example, for a propeller shaft of a vessel, or for an impeller in a liquid different from water. In any event, in the device of this invention, the flow of fluid is to the ambient, not into a pump, and, as has been indicated, the use of a gas, preferably air, and a labyrinth seal are particularly desirable.

It is claimed:

1. In a submerged rotating shaft mechanism wherein a cylindrical shaft projecting from a gearbox rotates in a gland an outer end of which, beyond which the shaft projects, is below the level of liquid in which the shaft rotates, the improvement comprising at least one substantially fluid tight inner seal surrounding said shaft, an outer, labyrinth seal spaced from said inner seal in a direction toward the outer end of said gland to define, with said inner seal and an interior surface of said gland, a chamber, a gas connection communicating with said chamber and a source of gas under super-ambient pressure communicating with said connection, hence said chamber, whereby gas is forced outwardly from said chamber through said labyrinth seal.

2. The improvement of claim 1 wherein the gas is air.

3. The improvement of claim 1 wherein the inner seal that defines one wall of the chamber is a self-lubricating seal.

4. The improvement of claim 3 wherein a double-lip seal is positioned between the self-lubricating seal and a drive mechanism.

5. In a dredge pump drive system having a gearbox and a driven shaft projecting from said gearbox, a hollow gland, open at its outer end and connected to said gearbox, through which said shaft extends and projects from said open end, the improvement compirising a double-lip seal, within said gland and embracing said shaft, contiguous said gearbox, an intermediate, self-lubricating, seal, within said gland and embracing said shaft, adjacent and outboard of said double-lip seal with respect to said gearbox, a labyrinth seal, within said gland and embracing said shaft, spaced outboardly from said self-lubricating seal and the inside of said gland, a chamber, an air fitting communicating from the outside of said gland with said chamber, and a source of air at super-ambient pressure connected to said fitting whereby air is forced through said labyrinth seal axially outwardly from said gland to flush said seal substantially constantly when said pump is being operated.

6. The improvement of claim 5 including means for supplying oil to the interior of said gearbox at a pressure of a magnitude substantially the same as that of the air pressure supplied said chamber.

7. In a submerged rotating shaft mechanism including a gearbox having a gland and a shaft projecting from said gearbox, through and beyond said gland, said gland having an end opening below the surface of a liquid in which said shaft rotates, the improvement comprising an inner seal adjacent said gearbox, an outer seal adjacent said outer end of said gland and spaced from said inner seal, said inner and outer seals embracing said shaft and defining, with said shaft and said gland, a chamber inside said gland, a gas fitting communicating with said chamber and outside said gland, and means, connected to said gas fitting, to supply fluid to said chamber continuously under super-ambient pressure, said outer seal being constructed to allow limited leakage of said gas through it.

8. The improvement of claim 7 including means for supplying oil to said gearbox at a pressure of a magnitude substantially that of the fluid supplied to said chamber.

9. The improvement of claim 7 wherein the gas is air.

10. The improvement of claim 7 wherein the outer seal is a labyrinth seal.

11. The improvement of claim 7 including an innermost seal provided between said inner seal and said gearbox.

12. The improvement of claim 11 wherein the inner seal is self-lubricating.

13. The improvement of claim 11 wherein said innermost seal is a double-lip seal.

14. The improvement of claim 13 wherein said inner seal is a single lip seal.

* * * * *

UNITED STATES PATENT AND TRADEMARK OFFICE
CERTIFICATE OF CORRECTION

PATENT NO. : 4,819,948

DATED : Apr. 11, 1989

INVENTOR(S) : G. David Merrifield

It is certified that error appears in the above-identified patent and that said Letters Patent is hereby corrected as shown below:

Column 4, line 44, delete "fluid" and insert "gas"

Signed and Sealed this

Twenty-third Day of January, 1990

*Attest:*

JEFFREY M. SAMUELS

*Attesting Officer*　　*Acting Commissioner of Patents and Trademarks*